United States Patent Office 3,647,709
Patented Mar. 7, 1972

3,647,709
PRODUCTION OF SILICA GELS
Thomas Hill, Falkirk, Scotland, assignor to BP
Chemicals Limited, London, England
No Drawing. Filed Nov. 24, 1969, Ser. No. 879,526
Claims priority, application Great Britain, Nov. 25, 1968,
55,796/68
Int. Cl. B01j 13/00; C01b 33/14
U.S. Cl. 252—317                                      8 Claims

ABSTRACT OF THE DISCLOSURE

Silica gels from "densified" silica sols e.g. "Ludox" by process including a hydrothermal treatment at a temperature from 100° C. to 370° C. for from 12 to 200 hours at such a pressure that the water in the liquid phase does not evaporate.

The present invention relates to a process for the production of silica gel.

According to the present invention in the preparation of silica gel from silica sols a densified silica sol as herein defined is subjected to a hydrothermal treatment at a temperature of at least 100° C.

By densified silica sol is meant throughout this specification an aqueous sol containing dense particles of colloidal silica having a regular spherical shape. Such sols may be produced by the controlled addition of dilute amorphous silicic acid sol to a boiling "heel" of colloidal silica. The amorphous sol is prepared by passing dilute sodium silicate in aqueous solution through an ion exchange column, sodium ion being added to stabilise the final colloid which is usually maintained at a pH of about 10. Examples of such sols are the colloidal silica sols sold by Du Pont under the trade name "Ludox."

The concentration of silica in the sol may vary over a moderately wide range. The upper limit is set by the stability of the sols, while with low silica contents very large equipment is to be required. The concentration of the silica in the sol may be in the range 5% to 30% wt./wt.

By "hydrothermal treatment" we mean throughout the present specification the heating of the silica sol under such pressure that the water remains in the liquid phase and does not evaporate off.

The hydrothermal treatment may be carried out so that a silica sol remains at the end of the treatment, the gel being formed subsequently for example by evaporation of the treated silica sol. It is preferred however to carry out the hydrothermal treatment under such conditions that the gel is formed during the hydrothermal treatment. If the gel is to be formed during the hydrothermal treatment it is preferred to adjust the pH of the sol before the hydrothermal treatment to a value in the range 6–7 e.g. by the addition of an acid, e.g. acetic acid. The upper temperature limit for the hydrothermal treatment will of course be the critical temperature of water. The upper temperature limit may be for example 370° C. If the silica gel is to be formed during the hydrothermal treatment, the temperature of the hydrothermal treatment is preferably in the range 100° C. to 300° C. The duration of the hydrothermal reaction if a gel is to be produced may suitably vary over a moderately wide range, for example 12 to 200 hours. The reaction giving rise to the gels proceeds more slowly with dilute sols e.g. sols having less than 10% silica wt./wt.

If desired the hydrotheral treatment may be carried out in the presence of fluoride ions which may be added for example by the addition of ammonium fluorosilicate or ammonium fluoride to the silica sol. The concentration of the fluoride ion in the form may vary over a moderately wide range for example up to 5% by weight of the sol. The quantity of fluoride ion added will depend upon the type of gel structure required and the conditions of the hydrothermal treatment and is discussed in more detail below. The presence of the fluoride ion enables gel formation during the hydrothermal treatment to take place within a range of conditions which are wider than those used when no fluoride ion is added. Thus, in the presence of fluoride ion, silica gel may be formed more rapidly during the hydrothermal treatment at sol concentrations in excess of 10% by weight and will also be obtained when the initial silica sol starting material is diluted to give a silica concentration in the range 5 to 10% $SiO_2$ by weight.

The hydrothermal treatment of the present invention results in the microstructure of the silica gel finally obtained being different from that which would be obtained from the silica sol before it has been subjected to the hydrothermal treatment. The term "microstructure" refers to the particle size, shape and density and also to the surface area and pore volume in different sized pores. The process of the present invention enables a silica gel with a wide range of microstructures to be prepared. Thus it is possible to vary the microstructures by varying (a) the silica sol used as starting material (b) the concentration of silica in the sol when it is subjected to the hydrothermal treatment (c) the temperature at which the hydrothermal treatment is carried out (d) the duration of the hydrothermal treatment (e) the use of a catalyst, e.g. fluoride ion and (f) the initial pH of the sol. Thus if hydrothermal treatment is carried out in the absence of fluoride ion the pore size is increased without too great a loss of surface area. If the hydrothermal treatment is carried out in the presence of fluoride ion gel formation will occur more rapidly and a reduction in surface area and porosity will take place. The effect of adding a given quantity of fluoride ion will depend upon the conditions of the hydrothermal treatment, and on the silica sol used. Thus at 180° C. with a 30% sol, the F⁻ ion should preferably not exceed 4% of the $SiO_2$ content by weight. However larger amounts of F⁻ may be tolerated at lower temperatures and lower $SiO_2$ concentrations in the sol.

The invention will now be described with reference to the following examples. The pore size distributions referred to in the examples were determined by using the automatic porosimeter described in J. Sci. Instr. 44 922 (1967) and applying the methods of calculation of Cranston & Inkley, Advances in Catalysis 9, 143.

EXAMPLE 1

A series of experiments was carried out in which samples of a densified silica sol sold by E. I. du Pont de Nemours as "Ludox LS" and whose characteristics are given in Table 1 were treated with acid to reduce the pH and heated in an autoclave; in some cases with the addition of other materials. The conditions used are those given for samples 2 to 7 in Table 2. Gels were formed in all cases, and the distribution of surface area and pore size among pores of different diameter is shown in Table 3 under samples 2 to 7.

EXAMPLE A

This is a comparative example not according to the invention. A sample of the "Ludox LS" silica sol used in Example 1 and identified as Sample 1 was converted into a gel by evaporation to dryness. The distribution of surface area and pore volume among pores of different diameter is shown in Table 3 under Sample 1.

On comparing the results for Sample 1 with those for Samples 2 to 7, it will be seen that the hydrothermal treatment makes possible the production of gels whose microstructure is quite different from that of the gel produced by the prior art evaporation process. Furthermore it will be seen that, although when preparing a gel by evaporation of a silica sol only one type of microstructure is formed, the hydrothermal treatment makes possible by controlling the conditions of the treatment, the preparation of gels having for example surface areas both greater and smaller and gels which are more and less porous than the gel prepared by evaporation.

EXAMPLE 2

A series of experiments was carried out in which three samples of a densified silica sol sold by E. I. du Pont de Nemours under the name "Ludox SM" and whose characteristics are given in Table 1, was heated in an autoclave. One sample (identified as Sample 2) (80 cc.) was heated for approximately 80 hours at 180° C. No solid was formed after this hydrothermal treatment. The sol was then acidified to pH 6 with acetic acid and evaporated to dryness.

Two further 80 cc. samples of the sol identified as Samples 3 and 4 were acidified to pH 6 with acetic acid and heated in the autoclave for 48 hours and 200 hours respectively at 180° C. Gels were formed in both cases. The distribution of pore volume and surface area among pores of different diameter is shown in Table 4.

EXAMPLE B

In a comparative example not according to the invention a sample (80 cc.) of "Ludox SM" was converted into a gel by evaporation to dryness. The distribution of surface area and pore volume among pores of different volume is shown in Table 4 under Sample 1.

APPENDIX 1

TABLE 1

|  | "Ludox" HS | "Ludox" LS | "Ludox" SM |
|---|---|---|---|
| Percent colloidal silica as $SiO_2$ | 30.0 | 30.0 | 15.0 |
| Ratio, wt. $SiO_2/Na_2O$ | 95 | 285 | 155 |
| Chloride as NaCl, percent | 0.04 | 0.002 | 0.001 |
| Sulfate as $Na_2SO_4$, percent | 0.05 | 0.006 | 0.003 |
| Viscosity at 25° C., cps | 3.6 | 13 | 4.3 |
| pH at 25° C | 9.8 | 8.4 | 8.5 |
| Surface area B.E.T.[1] method, m.²/g. silica | 210 | 210 | 400 |
| Approximate particle diameter, mu | 15 | 15 | 7 |
| Turbidity [2] | 21 | 17 | 6 |
| Stability | ([3]) | ([4]) | ([4]) |

[1] Nitrogen absorption method P. H. Emmett, "Symposium on New Methods for Particle Size Determination," p. 95, pub. by ASTM, Mar. 4, 1941.
[2] Fisher Electrophotometer, 525 B Filter.
[3] Stable except toward freezing which causes irreversible precipitation. Freezing point 32° F.
[4] Same as "Ludox" HS.

TABLE 2
Conditions of gel preparations—gels from "Ludox LS"

| Sample No. | Volume of sol, cc. | Weight $SiO_3$, gms. | pH adjusted to— | Catalyst/co-reactant added | Weight, catalyst or co-reactant, gms. | Temperature of reaction, °C | Time of reaction, hours |
|---|---|---|---|---|---|---|---|
| 1 | Ca. 50 | ([1]) | Evaporated | To dryness | | | |
| 2 | 70 | 24.0 | 5.0 | Nil | | 180–190 | 30 |
| 3 | 80 | 27.5 | 5.0 | A.F.S. | 1.3 | 180–190 | 24 |
| 4 | 80 | 27.5 | 6.0 | A.F.S. | 0.2 | 180–190 | 48 |
| 5 | 27 | 9.3 | 6.0 | Water (64 cc.) plus A.F.S. | 0.2 | 180–190 | 50 |
| 6 | 80 | 27.5 | 6.0 | A.F.S. | 0.65 | 180–190 | 70 |
| 7 | 70 | 24.0 | 6.0 | Aluminium nitrate | 2.1 | 150 | Ca. 180 |

[1] Cc. sol.

NOTE.—A.F.S.=Ammonium fluorosilicate.

TABLE 3.—DISTRIBUTION OF SURFACE AREA AND PORE VOLUME THROUGH PORE DIAMETER

Gels derived from Ludox LS (Table 1) A=percent total surface area; B=percent total pore volume, in pore diameter range

| Pore diameter range, angstroms | Sample | | | | | | | | | | | | | |
|---|---|---|---|---|---|---|---|---|---|---|---|---|---|---|
| | A | B | A | B | A | B | A | B | A | B | A | B | A | B |
| 0–50 | 3.0 | 0.5 | Nil | Nil | 18.0 | 1.0 | 3.0 | 0.5 | 4.0 | 0 | 4.0 | 0.5 | 10.0 | 2.0 |
| 50–100 | 26.0 | 12.0 | 1.0 | 0 | 15.0 | 5.5 | 7.0 | 1.0 | 7.0 | 2.0 | 7.0 | 1.0 | 20.0 | 7.0 |
| 100–150 | 22.0 | 17.0 | 10.0 | 2.0 | 11.0 | 4.0 | 7.0 | 2.0 | 7.0 | 2.0 | 7.0 | 2.0 | 15.0 | 7.0 |
| 150–200 | 24.0 | 22.0 | 10.0 | 4.0 | 6.0 | 3.0 | 7.0 | 2.0 | 7.0 | 3.0 | 6.0 | 2.0 | 13.0 | 10.0 |
| 200–250 | 18.0 | 18.0 | 12.0 | 5.0 | 5.0 | 4.0 | 6.0 | 2.0 | 6.0 | 3.0 | 3.0 | 3.0 | 10.0 | 12.0 |
| 250–300 | 6.0 | 9.0 | 15.0 | 5.0 | 4.0 | 3.0 | 4.0 | 2.0 | 5.0 | 3.0 | 6.0 | 3.0 | 9.0 | 12.0 |
| 300–350 | 0.5 | 9.0 | 12.0 | 8.0 | 5.0 | 3.0 | 5.0 | 2.0 | 6.0 | 4.0 | 5.0 | 3.0 | 7.0 | 10.0 |
| 350–400 | 0.5 | 12.0 | 11.0 | 7.0 | 3.0 | 3.0 | 4.0 | 3.0 | 4.0 | 5.0 | 5.0 | 4.0 | 5.0 | 12.0 |
| 400–450 | 0.5 | 12.0 | 6.0 | 5.0 | 3.0 | 3.0 | 3.0 | 3.0 | 6.0 | 5.0 | 5.0 | 5.0 | 5.0 | 9.0 |
| 450–500 | 0.5 | 12.0 | 4.0 | 3.0 | 3.0 | 3.0 | 4.0 | 3.0 | 6.0 | 7.0 | 5.0 | 5.0 | 3.0 | 5.0 |
| 500–550 | 0.5 | 12.0 | 2.0 | 2.0 | 2.0 | 4.0 | 4.0 | 4.0 | 5.0 | 7.0 | 4.0 | 4.0 | 1.0 | 2.0 |
| 550–600 | 0.5 | 12.0 | 2.0 | 2.0 | 1.0 | 4.0 | 4.0 | 3.0 | 7.0 | 9.0 | 5.0 | 5.0 | 1.0 | 2.0 |
| 600–650 | 0.5 | 12.0 | 1.0 | 1.0 | 1.0 | 4.0 | 3.0 | 4.0 | 8.0 | 9.0 | 6.0 | 8.0 | 0.5 | 1.0 |
| 650–700 | 0.5 | 12.0 | 1.0 | 1.0 | 1.0 | 4.0 | 4.0 | 5.0 | 6.0 | 9.0 | 6.0 | 8.0 | 0.5 | 1.0 |
| 700–750 | 0.5 | 12.0 | 1.0 | 1.0 | 3.0 | 4.0 | 4.0 | 5.0 | 4.0 | 9.0 | 6.0 | 8.0 | 0.5 | 8.0 |
| 750–800 | 0.5 | 12.0 | 1.0 | 1.0 | 5.0 | 4.0 | 5.0 | 5.5 | 6.0 | 10.0 | 5.0 | 9.0 | 0.5 | 8.0 |
| 800–850 | 0.5 | 12.0 | 1.0 | 1.0 | 1.0 | 4.0 | 4.0 | 6.0 | 4.0 | 9.0 | 4.0 | 8.0 | 0.5 | 8.0 |
| 850–900 | 0.5 | 12.0 | 1.0 | 1.0 | 2.0 | 4.0 | 3.0 | 6.0 | 3.0 | 4.0 | 4.0 | 6.0 | 0.5 | 8.0 |
| 900–950 | 0.5 | 12.0 | 1.0 | 1.0 | 3.0 | 3.0 | 2.0 | 6.0 | Nil | Nil | 2.0 | 5.0 | 0.5 | 8.0 |
| 950–1,000 | 0.5 | 12.0 | 1.0 | 1.0 | 3.0 | 5.0 | 6.0 | 6.0 | Nil | Nil | 2.0 | 4.0 | 0.5 | 8.0 |
| 1,000 | 0.5 | 12.0 | 8.0 | 49.0 | 5.0 | 29.0 | 15.0 | 6.0 | Nil | Nil | 1.0 | 8.0 | 0.5 | 8.0 |
| Total surface area, m.²/g. | 130 | | 119 | | 33 | | 75 | | 83 | | 77 | | 183 | |
| Total pore volume, cc./g. | 0.55 | | 1.69 | | 0.31 | | 1.14 | | 0.91 | | 0.94 | | 0.96 | |

TABLE 4.—DISTRIBUTION OF SURFACE AREA AND PORE VOLUME THROUGH PORE DIAMETER GELS DERIVED FROM LUDOX SM

A = percent total surface area in given pore diameter range;
B = percent total pore volume in given pore diameter range

| Pore diameter range, angstroms | Sample 1 A | Sample 1 B | Sample 2 A | Sample 2 B | Sample 3 A | Sample 3 B | Sample 4 A | Sample 4 B |
|---|---|---|---|---|---|---|---|---|
| 0-50 | 50.0 | 35.0 | 7.5 | 3.0 | Nil | 1.0 | Nil | Nil |
| 50-100 | 49.0 | 37.0 | 38.5 | 23.0 | 0.5 | 1.0 | 3.0 | 2.0 |
| 100-150 | 1.0 | 28.0 | 31.0 | 31.0 | 6.0 | 1.0 | 4.0 | 4.0 |
| 150-200 | | | 15.0 | 21.0 | 6.0 | 1.0 | 3.0 | 4.0 |
| 200-250 | | | 6.0 | 11.0 | 5.0 | 3.0 | 4.0 | 3.5 |
| 250-300 | | | 1.0 | 4.0 | 6.0 | 3.0 | 3.0 | 3.0 |
| 300-350 | | | 1.0 | 7.0 | 6.0 | 3.0 | 3.0 | 3.5 |
| 350-400 | | | 1.0 | 7.0 | 6.0 | 3.0 | 2.0 | 3.0 |
| 400-450 | | | 1.0 | 7.0 | 6.0 | 3.0 | 2.0 | 2.5 |
| 450-500 | | | | | 5.0 | 3.0 | 2.0 | 2.5 |
| 500-550 | | | | | 8.0 | 6.0 | 3.5 | 2.0 |
| 550-600 | | | | | 5.0 | 5.0 | 2.5 | 3.0 |
| 600-650 | | | | | 3.0 | 2.5 | 3.0 | 2.5 |
| 650-700 | | | | | 3.0 | 2.5 | 2.0 | 2.5 |
| 700-750 | | | | | 3.0 | 2.5 | 2.0 | 2.5 |
| 750-800 | | | | | 2.0 | 2.5 | 3.0 | 2.0 |
| 800-850 | | | | | 2.0 | 2.5 | 2.5 | 2.5 |
| 850-900 | | | | | 2.0 | 2.5 | 3.0 | 2.0 |
| 900-950 | | | | | 3.0 | 2.5 | 3.0 | 2.5 |
| 950-1,000 | | | | | 2.0 | 2.5 | 2.5 | 2.0 |
| >1,000 | | | | | 19.0 | 52.0 | 47.0 | 51.0 |
| Total surface area, m.²/g. | 304 | | 96 | | 70 | | 51 | |
| Total pore volume, cc./g. | 0.438 | | 0.312 | | 1.29 | | 1.13 | |

I claim:
1. A process for the preparation of silica gel which comprises heating a densified silica sol containing from 5% to 30% of silica and having a pH of from 6 to 7 at a temperature of from 100° C. to 370° C. for from 12 to 200 hours at such a pressure that the water in the liquid phase does not evaporate.

2. A process according to claim 1 wherein the temperature is in the range 100° to 300° C.

3. A process according to claim 1 wherein the sol is one which has been brought to a pH from 6 to 7 by addition of acetic acid.

4. A process according to claim 1 wherein the concentration of the silica sol is at least 10% by weight.

5. A process according to claim 1 carried out in the presence of fluoride ions.

6. A process according to claim 5 wherein ammonium fluorosilicate is added to the silica sol.

7. A process according to claim 5 wherein ammonium fluoride is added to the silica sol.

8. A process according to claim 5 wherein the concentration of fluoride ion is not more than 5% by weight of the sol.

References Cited

UNITED STATES PATENTS

| | | | |
|---|---|---|---|
| 1,772,055 | 8/1930 | Miller et al. | 23—182 |
| 2,516,967 | 8/1950 | Elam | 252—317 X |
| 2,594,725 | 4/1952 | Britt | 252—317 X |
| 3,094,384 | 6/1963 | Bertolacini et al. | 23—182 X |

RICHARD D. LOVERING, Primary Examiner

U.S. Cl. X.R.

23—182 R; 252—313 S, 451